United States Patent
Hung et al.

(10) Patent No.: US 11,191,988 B2
(45) Date of Patent: Dec. 7, 2021

(54) PROCESS OF PRODUCING EXTINGUISHING AGENT

(71) Applicants: Fu-An Hung, Taichung (TW); Jing-Kai Hung, Taichung (TW); Jing-Yuan Hong, Taichung (TW)

(72) Inventors: Fu-An Hung, Taichung (TW); Jing-Kai Hung, Taichung (TW); Jing-Yuan Hong, Taichung (TW)

(*) Notice: Subject to any disclaimer, the term of this patent is extended or adjusted under 35 U.S.C. 154(b) by 0 days.

(21) Appl. No.: 17/004,032

(22) Filed: Aug. 27, 2020

(65) Prior Publication Data
US 2020/0391065 A1    Dec. 17, 2020

(51) Int. Cl.
  *A62D 1/00*    (2006.01)
  *C07F 9/00*    (2006.01)
(52) U.S. Cl.
  CPC .............. *A62D 1/0042* (2013.01); *C07F 9/00* (2013.01)
(58) Field of Classification Search
  CPC ................................. A62D 1/0042; C07F 9/00
  See application file for complete search history.

(56) References Cited

U.S. PATENT DOCUMENTS

2017/0056698 A1*    3/2017    Pai ................. A62D 1/0042

FOREIGN PATENT DOCUMENTS

WO    WO-2017163401 A1 *    9/2017    ............... A62D 1/06

OTHER PUBLICATIONS

English Translation of WO-2017163401-A1 (Year: 2017).*

* cited by examiner

*Primary Examiner* — Andrew J. Oyer

(57) ABSTRACT

A process of producing an extinguishing agent includes dissolving 5 g to 90 g of diammonium hydrogen phosphate, 0.1 g to 60 g of urea, 1 g to 90 g of ammonium carbonate, 5 g to 90 of ammonium sulfate, and 20 g to 250 g of potassium carbonate in 400 ml to 550 ml of water at a temperature of 30° C. to 90° C. to form a first solution; mixing the first solution with 5 g to 500 g of surfactant to undergo a first reaction for forming a second solution; and mixing the second solution with 1000 ml of water to undergo a second reaction for forming an extinguishing agent.

4 Claims, 1 Drawing Sheet

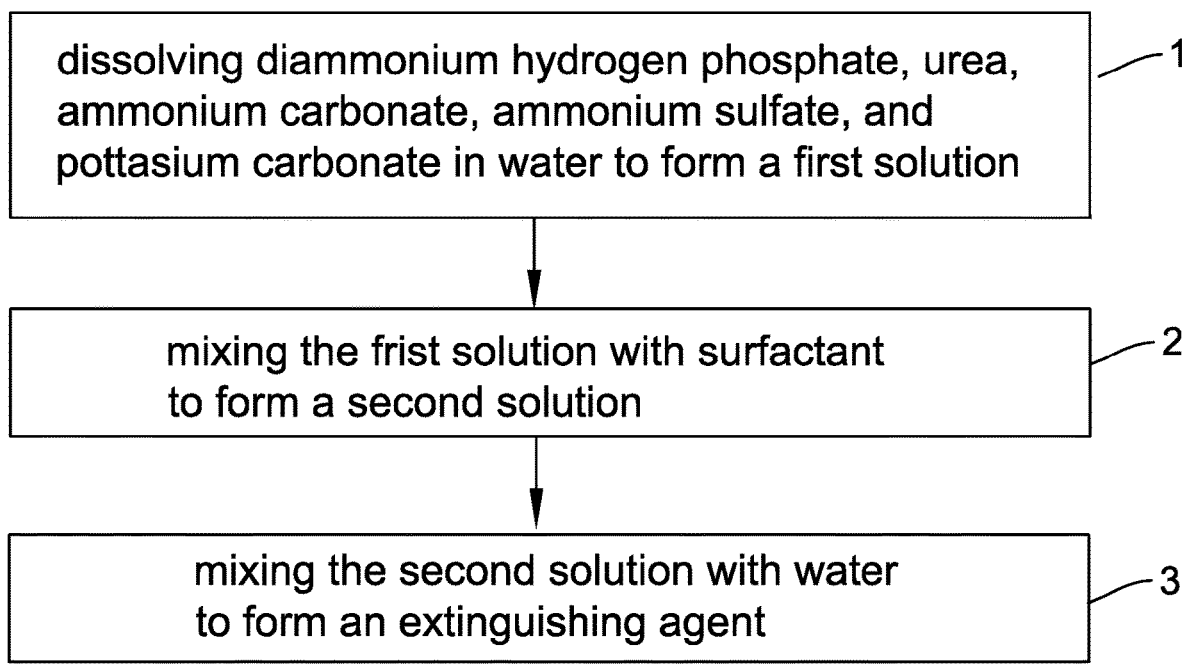

PROCESS OF PRODUCING EXTINGUISHING AGENT

BACKGROUND OF THE INVENTION

1. Field of the Invention

The invention relates to extinguishing agent production and more particularly to a process of producing an extinguishing agent.

2. Description of Related Art

Extinguishing agents have been made up of various compositions. For example, there is a conventional extinguishing agent comprising urea, sodium chloride, sodium carbonic anhydride, and ammonium sulfate.

There is a conventional process for producing an extinguishing agent comprising the steps of dissolving sodium chloride, ammonium dihydrogenphosphate, and ammonium hydrogen carbonate in hot water at a temperature of 30° C. to 40° C. to form a solution; allowing the ammonium dihydrogenphosphate and the ammonium hydrogen carbonate, as dissolved, to undergo a reaction; and adding water to raise the temperature of the solution from 60° C. to 70° C.

Notwithstanding the conventional art, the invention is neither taught nor rendered obvious thereby.

SUMMARY OF THE INVENTION

It is therefore one object of the invention to provide a process of producing an extinguishing agent comprising dissolving 5 g to 90 g of diammonium hydrogen phosphate, 0.1 g to 60 g of urea, 1 g to 90 g of ammonium carbonate, 5 g to 90 of ammonium sulfate, and 20 g to 250 g of potassium carbonate in 400 ml to 550 ml of water at a temperature of 30° C. to 90° C. to form a first solution; mixing the first solution with 5 g to 500 g of surfactant to undergo a first reaction for forming a second solution; and mixing the second solution with 1000 ml of water to undergo a second reaction for forming an extinguishing agent.

The above and other objects, features and advantages of the invention will become apparent from the following detailed description taken with the accompanying drawings.

BRIEF DESCRIPTION OF THE DRAWINGS

FIG. 1 is a flow chart of a process of producing an extinguishing agent according to the invention.

DETAILED DESCRIPTION OF THE INVENTION

Referring to FIG. 1, a process of producing an extinguishing agent in accordance with the invention is illustrated. The process comprises step 1 of dissolving 5 g to 90 g of diammonium hydrogen phosphate, 0.1 g to 60 g of urea, 1 g to 90 g of ammonium carbonate, 5 g to 90 of ammonium sulfate, and 20 g to 250 g of potassium carbonate in 400 ml to 550 ml of water at a temperature of 30° C. to 90° C. to form a first solution; step 2 of mixing the first solution with 5 g to 500 g of surfactant to undergo a reaction for forming a second solution; and step 3 of mixing the second solution with 1000 ml of water to undergo a second reaction for forming an extinguishing agent.

Preferably, the surfactant is selected from the group consisting of 5 g to 500 g of protein being water dissolved, carbon-based surfactant, hydrocarbon-based surfactant, ester polyether surfactant, linear alkaloid sulfate ester salt surfactant, and alkaloid surfactant.

The extinguishing agent is further subjected to an environment at a temperature of 20° C. to form a second extinguishing agent having a specific gravity of 1.0 to 1.2 and a pH value of 6.5 to 9.

While the invention has been described in terms of preferred embodiments, those skilled in the art will recognize that the invention can be practiced with modifications within the spirit and scope of the appended claims.

What is claimed is:

1. A process of producing an extinguishing agent, comprising the steps of:
   (a) dissolving 5 g to 90 g of diammonium hydrogen phosphate, 0.1 g to 60 g of urea, 1 g to 90 g of ammonium carbonate, 5 g to 90 of ammonium sulfate, and 20 g to 250 g of potassium carbonate in 400 ml to 550 ml of water at a temperature of 30° C. to 90° C. to form a first solution;
   (b) mixing the first solution with 5 g to 500 g of surfactant to undergo a reaction to form a second solution; and
   (c) diluting the second solution with 1000 ml of water to form an extinguishing agent.

2. The process of claim 1, wherein the surfactant is selected from the group consisting of 5 g to 500 g of protein being water dissolved, carbon-based surfactant, hydrocarbon-based surfactant, ester polyether surfactant, linear alkaloid sulfate ester salt surfactant, and alkaloid surfactant.

3. The process of claim 1, wherein the extinguishing agent is further subjected to an environment at a temperature of 20° C. to form a second extinguishing agent having a specific gravity of 1.0 to 1.2 and a pH value of 6.5 to 9.

4. The process of claim 2, wherein the extinguishing agent is further subjected to an environment at a temperature of 20° C. to form a second extinguishing agent having a specific gravity of 1.0 to 1.2 and a pH value of 6.5 to 9 g.

* * * * *